US010404613B1

(12) United States Patent
Brooker et al.

(10) Patent No.: US 10,404,613 B1
(45) Date of Patent: Sep. 3, 2019

(54) PLACEMENT OF CONTROL AND DATA PLANE RESOURCES

(71) Applicant: Amazon Technologies, Inc., Reno, NV (US)

(72) Inventors: Marc John Brooker, Seattle, WA (US); Marc Levy, Seattle, WA (US); Norbert Paul Kusters, Redmond, WA (US); David R. Richardson, Seattle, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1144 days.

(21) Appl. No.: 14/230,539

(22) Filed: Mar. 31, 2014

(51) Int. Cl.
| G06F 12/16 | (2006.01) |
| G06F 12/00 | (2006.01) |
| G06F 17/30 | (2006.01) |
| G06F 7/00 | (2006.01) |
| G06F 15/173 | (2006.01) |
| G06F 21/00 | (2013.01) |
| H04L 12/911 | (2013.01) |

(52) U.S. Cl.
CPC .................. H04L 47/70 (2013.01)

(58) Field of Classification Search
CPC ...................................... H04L 47/70
USPC ......................................... 709/226
See application file for complete search history.

(56) References Cited

U.S. PATENT DOCUMENTS

| 6,460,070 | B1 * | 10/2002 | Turek | G06F 11/0709 709/202 |
| 7,124,101 | B1 * | 10/2006 | Mikurak | G06Q 10/06 705/35 |
| 7,421,578 | B1 * | 9/2008 | Huang | H04L 63/065 370/254 |
| 7,647,327 | B2 * | 1/2010 | Aguren | G06F 16/10 707/999.1 |
| 8,560,699 | B1 * | 10/2013 | Theimer | H04L 63/20 709/226 |
| 8,868,766 | B1 * | 10/2014 | Theimer | G06F 9/5061 709/229 |
| 9,419,867 | B2 * | 8/2016 | Okholm | H04L 47/10 |
| 9,483,369 | B2 * | 11/2016 | Sporel | G06F 11/2023 |
| 9,569,232 | B1 * | 2/2017 | Brandwine | G06F 9/455 |
| 2003/0051195 | A1 * | 3/2003 | Bosa | H04L 41/0618 714/43 |
| 2006/0092976 | A1 * | 5/2006 | Lakshman | H04L 45/04 370/469 |

(Continued)

*Primary Examiner* — Kevin T Bates
*Assistant Examiner* — Golam Mahmud
(74) *Attorney, Agent, or Firm* — Davis Wright Tremaine LLP

(57) ABSTRACT

Computing resource services have computing resources allocated among regions and data zones, where regions can be completely separate deployments of an infrastructure to provide the highest degree of independence. The more regions that are utilized by a customer, the higher the level of fault tolerance may exist. Current networks consist of heavily distributed infrastructures or mainly centralized infrastructures, both of which can cause complete control plane failures when even a subset of a data zone or region loses network connectivity. The placement of control plane and data plane resources provides for optimal availability and durability during infrastructure failures.

20 Claims, 8 Drawing Sheets

(56) References Cited

U.S. PATENT DOCUMENTS

| | | | |
|---|---|---|---|
| 2008/0071900 A1* | 3/2008 | Hecker | H04L 41/0893 709/223 |
| 2009/0276771 A1* | 11/2009 | Nickolov | G06F 9/4856 717/177 |
| 2010/0250499 A1* | 9/2010 | McAlister | G06F 11/1451 707/679 |
| 2010/0251002 A1* | 9/2010 | Sivasubramanian | G06F 9/5061 714/2 |
| 2012/0072985 A1* | 3/2012 | Davne | H04L 63/0272 726/22 |
| 2013/0036105 A1* | 2/2013 | Lucas | G06F 16/2315 707/703 |
| 2013/0058351 A1* | 3/2013 | Casado | H04L 47/00 370/400 |
| 2014/0007236 A1* | 1/2014 | Krueger | G06F 21/552 726/23 |
| 2014/0040481 A1* | 2/2014 | Aubin | H04L 12/4641 709/226 |
| 2014/0052864 A1* | 2/2014 | Van Der Linden | G06F 9/5077 709/226 |
| 2014/0081916 A1* | 3/2014 | McAlister | G06F 11/2025 707/634 |
| 2014/0129700 A1* | 5/2014 | Mehta | H04L 43/0817 709/224 |
| 2015/0039763 A1* | 2/2015 | Chaudhary | H04L 47/125 709/226 |

\* cited by examiner

PLACEMENT OF CONTROL AND DATA PLANE RESOURCES

BACKGROUND

Organizations, companies and individuals often utilize networks of computing devices to provide a set of services to their users. Networks often span multiple geographical boundaries and often connect with other networks. An organization, for example, may support its operations using both internal networks of computing resources and external computing resources managed by others. Computers of the organization, for instance, may communicate with computers of other organizations to access and/or provide data while using services of another organization. In many cases, organizations configure and operate remote networks using hardware managed by other organizations, thereby reducing infrastructure costs and achieving other advantages.

As technology matures, computing resource service providers, which may be an Infrastructure-as-a-service (IaaS), platform-as-a-service (PaaS) and/or software-as-a-service (SaaS) provider, are employing a level of indirection over the physical computers and hardware, called virtual machine (VM) instances or containers, to make physical computing nodes replaceable. These VM instances are generally stored in data stores across regions and continents to enable virtual resources to run over existing hardware infrastructure.

Although uncommon, data centers, even highly available and durable data centers, may encounter a failure-type scenario that affects the availability of computing resources that are housed in the same zone or a portion of the same zone. If a customer maintained a sole instance of their data on a volume in a single zone that is affected by such a failure, that instance would not be available and no replicate would exist, causing the customer's only recourse to be waiting for the failure to be resolved.

BRIEF DESCRIPTION OF THE DRAWINGS

Various embodiments in accordance with the present disclosure will be described with reference to the drawings, in which.

DETAILED DESCRIPTION

Figure 1:
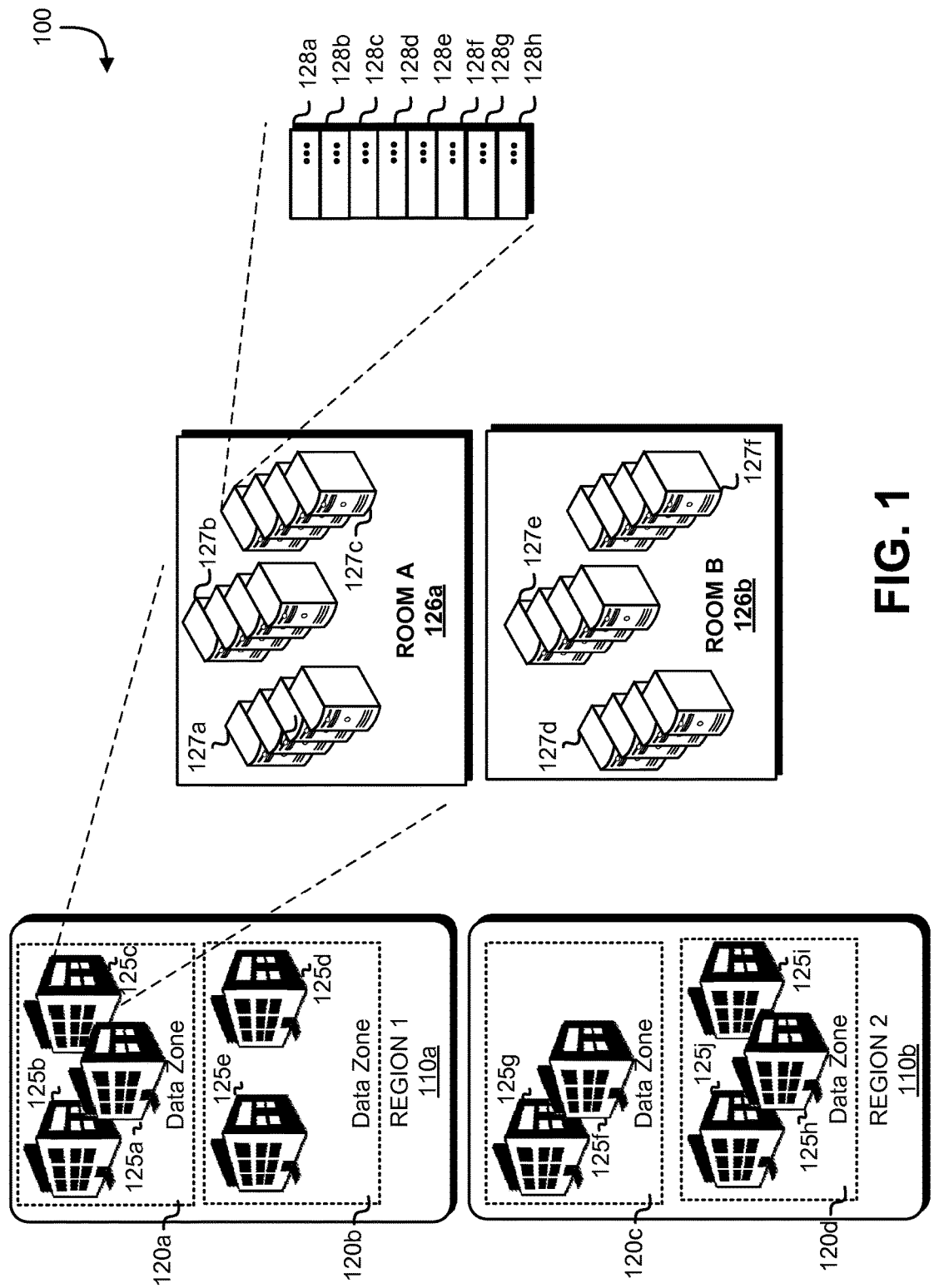
FIG. 1 is an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods and systems for tailoring control plane availability in a flexible manner according to customer needs in order to provide optimal behavior of networks, data stores and computing resources during network partitions. Data store servers are responsible for storing large amounts of data on behalf of customers. Customer data is typically replicated over multiple data store servers for both durability and availability. The data store control plane is responsible for identifying which set of servers contains the authoritative copy of the customer's data volume, and only allowing reads and writes to members of that set.

A control plane, in an embodiment, is a computer system, such as a virtual layer of software and hardware components, configured to manage and control actions, such as provisioning, scaling, etc. A control plane or environment for a control plane can be used to control aspects of a data plane (data environment). The functionality of a control can be provided as a set of web services. A customer can submit a request to the control plane via an application programming interface (API), for example, which can be analyzed to determine actions to be performed in a data plane, such as creating, deleting, expanding or otherwise modify a data store or data storage instance.

A fault zone, in an embodiment, is a logical grouping of resources defined according to a mode of failure. For example, fault zones can be defined by data center facilities (each data center may correspond to a different fault zone) because a failure of one (e.g., caused by a power failure, natural disaster, or other reason) does not affect the failure of the other. As another example, a fault zone can be the resources served by a backup generator. Resources served by a different backup generator would be in a different fault zone because, if that generator fails, it does not affect the operation of the ones attached to the other backup generator. Other examples of a fault zone can be physical data center locations with different power infrastructures, physical data center locations with different network infrastructure or different physical locations in different geographical areas. Fault zones can also have sub-fault zones. Basically, any way of dividing the resources according to the effects of a mode of failure (power outage, top of rack switch going down, comet, government confiscation, etc.).

In example embodiments, the computing resource service has computing resources allocated among regions and data zones. Regions can be completely separate deployments of an infrastructure and can be completely isolated from each other to provide the highest degree of independence. The more regions that are utilized by a customer, the higher the level of fault tolerance may exist. Within a region are data zones, which help customers build fault-tolerant applications. The data store control plane, in an embodiment, is a zonal system, which means that one control plane instance exists per data store installation, known as a data zone. In alternative example embodiments, a control plane can manage multiple data zones spread among different regions or fault zones. Data zones can be physically and logically separate infrastructures that are constructed to be independent while providing customers with high speeds, low latency network connectivity, an easy way to replicate data and a consistent set of management APIs.

Generally, data zones are logical groupings of computing resources (which may correspond to physical groupings) where the groupings can be defined in various ways, such as by geographical area or fault zone. For example, a computing resource service provider may have one or more in each of a plurality of geographical areas or fault zones. Each set of geographically grouped data centers may form a corresponding data zone. In this manner, customers of the computing resource service provider are able to take advantage of the geographically distributed nature of the computing resources for lowering latency, increasing durability, increasing availability and the like. It should be noted that while geographically clustered data centers are used for an illustrative example of a way in which data zones are formed, the techniques described herein are applicable to other logical groupings of computing resources. Data zones may be defined, for example, in a non-geographically defined manner, by data center room, by data center server rack and/or in other ways. The existence of a zonal control plane can cause outages to an entire data zone when only a subset of that zone loses power or network connectivity. This prevents both customers from making the best use of the fault isolation provided by separate datacenters, datacenter rooms and network fault zones.

One approach to reduce the extent of control plane failures is to have one instance of the control plane per volume, or other unit of granularity between a zone and a volume. For availability and durability reasons, this control plane instance needs to store data across multiple servers (a "replication group"). The placement of the servers in this group controls the availability of the data during different types of infrastructure failures.

If a quorum (e.g., majority or other satisfaction of applicable quorum rules) of the group of control planes is placed in the same infrastructure fault zone as both the data and the computing resources instance, a network partition that isolates that fault zone will not reduce the availability of the control plane to the data plane, customer volume or other network resource outside of the fault zone. It will also prevent failures in any other fault zone from reducing the availability of the control plane to the data plane. For example, example embodiments can prevent infrastructure outside the fault zones from accessing either the data or the control plane information. This arrangement is optimal for customers who want to maximally correlate the availability of their storage (data store volumes) with their computing resources. Additionally, example embodiments may include a control plane or set of control plane services that accepts customer requests and propagates the requests to an appropriate data store cluster. In some example embodiments, there is one set of data store control plane services per computing resource instance region; however, a control plane can be highly distributed across a data zone to provide availability and fault tolerance.

If the quorum (e.g., majority or other satisfaction of applicable quorum rules) of the control plane group, and some copy of the customer's data, is placed outside the fault zone containing the computing resources, then a failure of that fault zone will not prevent the user from safely detaching their storage from that computing resource instance and attaching it to a different computing resource instance. Typical use-cases include database failover such as a distributed relational database services. Multiple levels of control, from network fault zone, to room, to datacenter to data zone, to region allow maximal flexibility of control plane and data availability, and allows a data store to tailor control plane availability flexibly to customer needs to provide optimal behavior during infrastructure failures.

Despite building fault-tolerant facilities and applications, a failure of a network device or multiple network devices can cause the network to split into one or more partitions. Failures can occur for many reasons, for example earthquakes, natural disasters, human error in excavating a fiber, etc. In some failure situations, a data store control plane can be impacted, degraded or otherwise unavailable, thereby causing difficulties and failures to customers employing a single data zone to house their application or volume. Example embodiments presented herein provide for improvements to the control plane failures and more.

FIG. 1 an example of a layout of a network infrastructure 100 according to embodiments presented herein. In one example embodiment, computing resources are hosted by resource services in locations across the world. The locations of the resource services are generally divided into two categories referred to herein as regions and data zones. Alternative example embodiments may include additional divisions. Each region is a distinct geographical area that can include multiple data zones or fault zones, which can be isolated. For example, Region 1 (110*a*) includes data zones 120*a* and 120*b*. Region 2 (110*b*), a separate region that is located anywhere in the world, possibly near the Region 1, possibly on a different continent than Region 1 or possibly at the antipodal point of the world or anywhere in between, includes data zones 120*c* and 120*d*. For exemplary purposes, only two regions are shown; however, any number of regions and components of regions is possible.

Each of the four data zones 120*a-d* includes data centers, where each data zone can contain any number of data centers. For example, data zone 120*a* includes three data centers 125*a-c*, data zone 120*b* includes two data centers 125*d* and 125*e*, data zone 120*c* includes two data centers 125*f* and 125*g* and data zone 120*d* includes three data centers 125*h-i*. Each data zone may include as many buildings as desired or required. In an example embodiment, within the buildings, there are rooms, such as rooms 126*a* and 126*b* that can be configured contain addition infrastructure, such as server racks 127*a-f*, which could also be bricks within the server complex or room. In the example embodiment of FIG. 1, each server rack contains a number of individual servers, such as servers 128*a-h*. In an alternative example embodiment, any number of network components and hardware may be organized and laid out in many different configurations and infrastructures.

Figure 2:
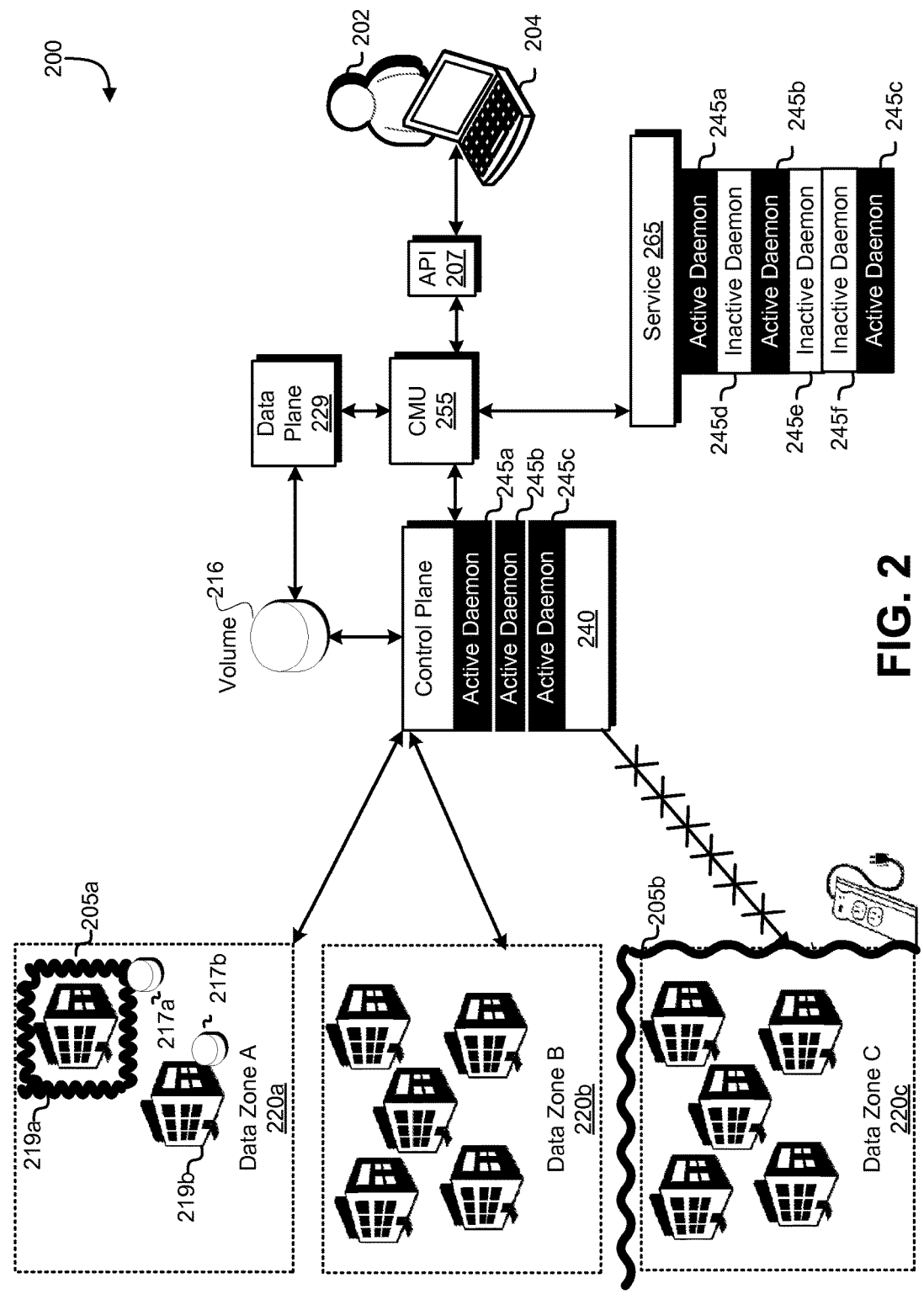
FIG. 2 is an illustrative example of an environment in which various embodiments can be implemented.

FIG. 2 is an example embodiment 200 of a control management unit configured to select daemons to form a control plane. In the example embodiment, a customer 202 submits an application programming interface (API) request 207 to a block data store (not shown) to create a data store volume 216. Example embodiments may include a network, such as a replicated, distributed block network. A control management unit (CMU) 255 or a similar network component is configured to determine computer processes (daemons) to form the control plane 240 for the requested volume. In some example embodiments, a system administrator or system controller determines multiple elements, including what should be done with the requested volume and where should the control plane is located; some such decisions can be made according to a logic protocol, such as a business logic. In some example embodiments, the control plane or other network component can request a location of computer processes, such as daemons 245*a-f*. Such a request may be directed toward a service 265 in control of fault zones of the daemons or other information, by the CMU or another service operably interconnected to the network containing information related to computer processes.

Examples of logic that can be employed to select daemons to form the control plane for the volume can include heuristics based on a size of the volume, heuristics based on the customer, the type of volume, such as a root volume, a data store standard volume, a provisioned input/output operations per second (IOPs) volume or alternative types of volumes currently known or hereinafter developed for use in distributed, replicated block stores. Additional examples of business logic can include preferences of the customer, such as optimization standards for the requested volume, in which the customer may prefer the ability to detach a volume and reattach the volume to a new computing resource in the case of network partition 205 or wait for the network partition 205 to be resolved and remain attached to the current computing resource or instance.

Example embodiments further include factors and actions used to create the volume in light of the business logic or additional information known or provided to the system. For example, if the system maintains records of customer behavior, whether it be received behavior information or inferred or historical behavior information. Additional examples can include creating the volume based on a physical location worldwide; in some geographical areas, data centers may be very concentrated, where in other geographical areas, data centers may be physically removed by large distances.

Returning to FIG. 2, example embodiments further include a system component, such as the CMU 255 being configured to request daemons or select daemons that conform to the specific business logic required or desired for that particular volume or customer. The CMU can instruct a service 265 to locate only daemons that comply with certain requirements and provide the information related to those daemons to determine if they should be used to form the control plane 240 for the volume 216.

In some example embodiments, the CMU is configured to determine a number of daemons to form the control plane for the volume; alternative example embodiments provide for a customer to request a specified number of daemons to form the control plane. As illustrated in FIG. 2, daemons 245*a-c* are selected to be a control plane for the volume. Daemons 245*a-c* can be located in different geographical areas so as to provide for redundancy and fault tolerance should one or more daemons be partitioned from the network. The CMU further instructs the selected daemons to execute a consensus protocol, such as Paxos, in order to agree upon a selected set of rules. Upon or after the control plane is formed, data related to the volume can be stored and the volume can be created according current or future methods of volume creation. In some example embodiments, the data related to the volume includes metadata about the volume, the geographical area of the volume, a fault zone of the volume, a service on which the volume operates or other metadata important for network communications.

In example embodiments, a control plane 240 is engaged when there is a failure on the network; the control plane performs executive functions, primarily. For example, the data plane 229, which is operably or physically interconnected with the control plane, can engage the control plane when the data plane encounters a problem. For example, if a connection drops between two replicas of a volume, if one of the replicas suffers a failure, if a network management application requires one replica to be purged, if a customer opts to detach or delete a volume and the like.

Looking at FIG. 2, in one example embodiment where a control plane can connect with multiple data zones, the control plane with three computer processes (daemons), 245*a-c*, is normally (in a no-fault situation) able to connect to three data zones, namely, Data. Zone A (220*a*), Data Zone B (220*b*) and Data Zone C (220*c*). However, in this example embodiment, in a fault situation, where the network is partitioned because of a failure or issue at Data Zone C (220*c*), the customer is still able to connect with Data Zones A and B. In the instant embodiment, three data zones are shown and three daemons are engaged; however, a person of ordinary skill in the art will recognize that less or more data zones and daemons may be used in accordance with the disclosure herein.

In an alternative example embodiment, if only one data center in an data zone was partitioned from the network, the control plane 240 formed of daemons 245*a-c* could maintain a connection with the other data centers in the data zone in which the volume 216 maintains one of more replicas. For example, if building 219*a* in Data Zone A (220*a*) experienced a failure or network partition, the control plane with daemons 245*a-c* can use the replica 217*b*, located in building 219*b*, of the volume 216 to maintain availability of the customer's volume despite a failure in the data center of that data zone. Wherein the volume may be virtualized and supported by multiple physical storage devices.

In an alternative example embodiment, a customer's volume may be connected to a control plane formed of three computer processes, which in turn connect to a single data zone. If the volume was only attached to a single control plane, e.g., a control plane with only one control agent, and that control plane experienced a failure, the volume would not be able to connect with the data zone unless the volume was detached from the current computing resource and reattached to a new computing resource or if the customer decided to wait for the control plane failures to be resolved, in which case the customer would remain without connectivity for an unknown period.

However, according to this alternative example embodiment, for a control plane formed by three control agents (daemons), if one of the daemons experienced a failure, the volume would remain connected to the single data zone via the other two daemons. Additional numbers of daemons may be selected to form the control plane, wherein the more daemons, the greater the fault tolerance. Alternative example embodiments may include the CMU being configured to receive an API request specifying new parameters for the control plane and requesting the CMU to reselect control agents to form the control plane to satisfy the new parameters.

In alternative example embodiments, a control plane tier system is used. For example, a layered control plane, such as a control plane for the control plane 240, can be enabled to tolerate large-scale network outages. For example, if a control plane was unavailable or partitioned off for a period of hours or days, customers would be unable to attach or detach volumes. However, the data plane would not suffer. Thus, in example embodiments, a tiered or distributed control plane would be able to provide service without its management layer.

Figure 3:
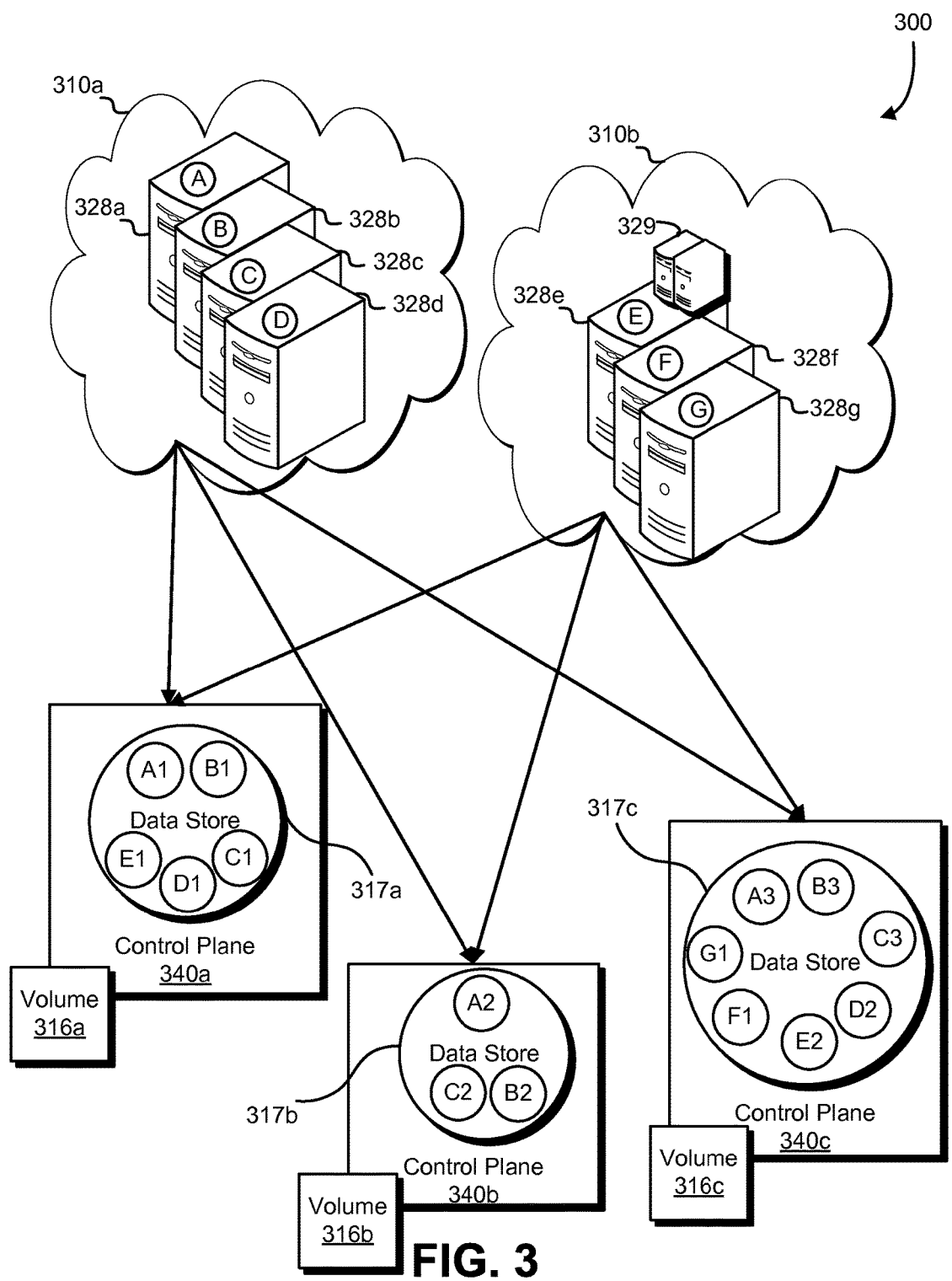
FIG. 3 is an illustrative example of a block diagram of a data replication process in accordance with at least one embodiment.

FIG. 3 illustrates an example embodiment 300 of dynamic control agents (daemons), located on multiple servers, participating in a control plane for a volume. A Disk and Execution Monitor (Daemon) also referred to herein as a dynamic control agent, a control agent or a computer process, is generally a long-running process that runs in the background on a host and responds to requests for services. For example, a daemon, often initiated at a boot time of a system, will perform some requested or programmed task, such as configuring hardware or responding to network requests. At least some storage devices in a network may include machine instructions defining an operating system, a protocol daemon and/or other daemons. At least a portion of the machine executable instructions may be stored (temporarily or more permanently) on the storage device(s) and/or may be received from an external source.

In an example embodiment, dynamic control agents are stored on servers throughout multiple data zones or regions. For example, dynamic control agents A1-A3 are stored on a server 328a, dynamic control agents B1-B3 are stored on a server 328b, dynamic control agents C1-C3 are stored on a server 328c, dynamic control agents D1 and D2 are stored on a server 328d, dynamic control agents E1 and E2 are stored on a server 328e, dynamic control agent F1 is stored on a server 328f and dynamic control agent G1 is stored on a server 328g. In some example embodiments, the dynamic control agents are stored on the same server as a data plane machine 329. The servers can be located in the same data center or data centers in different data zones of a region. In the example illustrated in FIG. 3, the servers 328a-328d are located in data zone 310a and the servers 328e-328g are located in data zone 310b, where data zones 310a and 310b are both located in the same region (not shown).

In an example embodiment, instead of launching an instance, the dynamic control agents, which are small programs on each of a large number of servers, are used to form a control plane for a volume. In another example embodiment, the daemons are each members of a large number of different control planes. In other words, a control plane for each volume is made up of a set of daemons, and each of those daemons is, in turn, a member of the control planes of other volumes. Such an example embodiment discloses a type of distributed consensus system, where there may be one consensus group formed per volume or per control plane.

For example, one or more of dynamic control agents A1-A3, B1-B3, C1-C3, D1, D2, E1, E2, F1 and G1, which are located on servers 328a-g, are selected by the CMU to form the control plane 340a. Specifically, the CMU or a component or application is configured to select dynamic control agents A1, B1, C1, D1 and E1 to participate in control plane 340a for volume 316a. The CMU determines zone in which to construct the control plane 340a and instructs the participating dynamic control agents to execute a consensus protocol and form a data store 317a for the control plane. The consensus protocol is executed so the agents agree on a set of data. Where the control plane can be a distributed collection of processes, the processes can be configured to connect with or able to access a data store, such that the data store is operably interconnected to the control plane in some example embodiments.

For example, control plane 340b includes daemons A2, B2 and C2 formed in a data store 317b as the control plane for volume 316b. The daemons forming in the control plane can be selected from different servers and can be used for both redundancy and fault-tolerance. In FIG. 3, a similar example embodiment exists for control plane 340c, which is comprised of agents A3, B3, C3, D2, E2, F1 and G1, which came from servers 328a-g to form a data store 317c as the control plane for volume 316c.

In alternative example embodiments, the consensus protocol used to ensure the daemons have consistent states could be a quorum-type protocol. The size or number of participants in the quorum changes the possibility of being affected by a random failure. For example, having more participants in the quorum makes it less likely that a failure situation will cause unavailability. Depending on what a customer is optimizing for, the CMU, a component or even the customer would choose a quorum size. Example embodiments may use the same or different optimization parameters to determine additional options for the control plane, such as choosing participants spread in a larger zone such that the control plane would be more likely to be more globally available.

Example embodiments further include customizable control planes on a per-volume basis, where a control plane and a data plane can be configured on a per-volume basis. For example, in other words, co-placement of a data plane and a control plane is enabled on a per-volume basis. Example embodiments provide for granular control of control planes such that data redundancy in geographically dispersed locations is achievable by composing the control plane from daemons located in many different fault zones, such as the control planes in FIG. 3.

Figure 4:
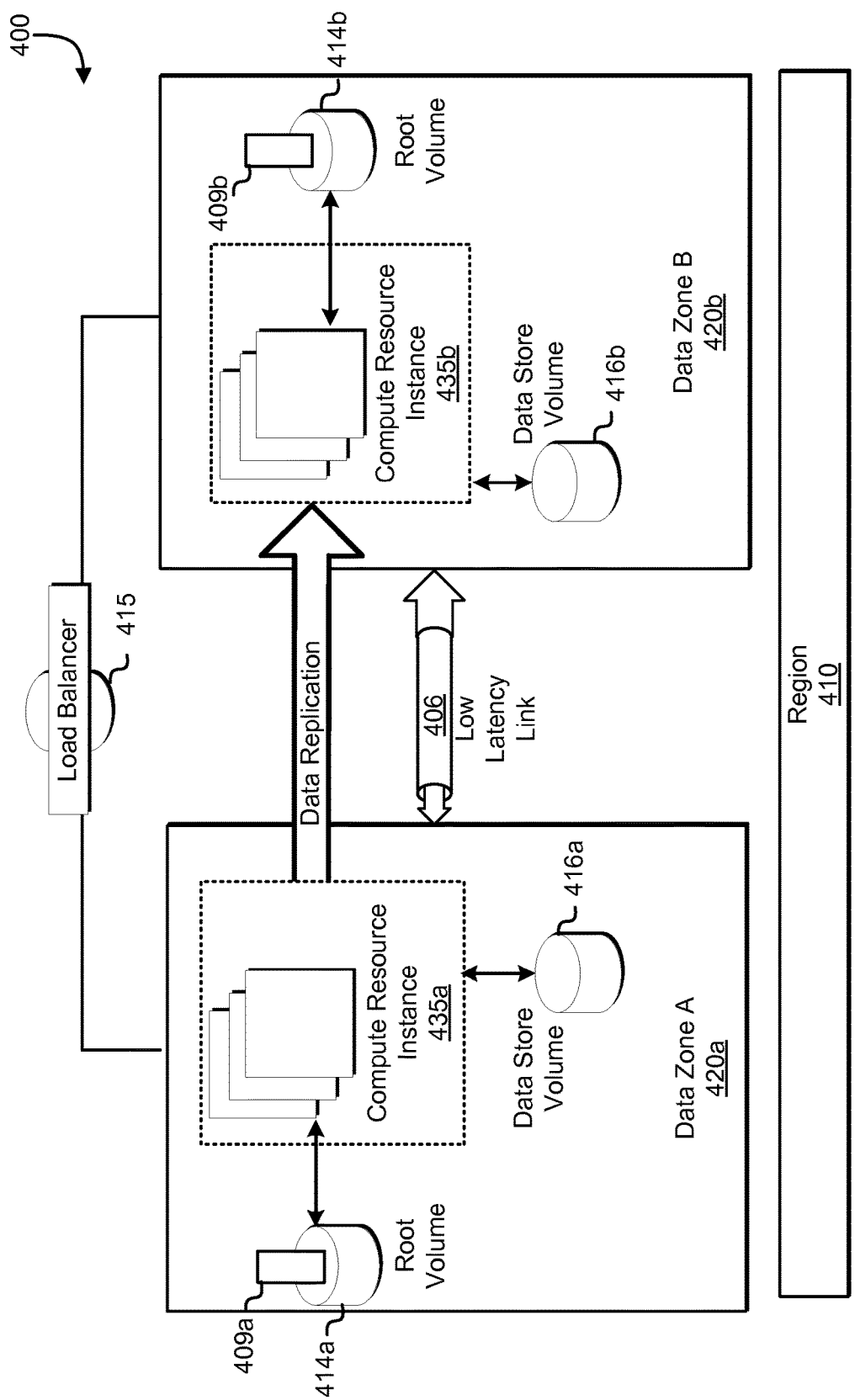
FIG. 4 is an illustrative example of a diagram of computing processes compiled in a control plane in accordance with at least one embodiment.

FIG. 4 illustrates an example of a redundant, distributed system, in accordance with at least one embodiment. The example embodiment of FIG. 4 includes one possible architecture 400 that illustrates a single region for simplicity. However, example embodiments of architectures of the systems and networks can be configured with distributed, redundant clusters deployed in different regions, where each region is a separate geographical area and can have any number of data zones. In an example embodiment, geo-replication can be employed to improve or ensure availability of a customer's volume in case of a network partition or network failure.

A distributed, replicated block data store, also referred to herein as a data store, is generally optimized for consistency and low-latency read and write access from computing resource instances. The two primary components of the block data store include: (1) A cluster of data stores each of which can run entirely within a data zone, which store user data and serve requests to the computing resource instances and (2) a set of control plane services used to coordinate user requests and propagate the requests to the data store clusters located in the data zones of a physical region. Example embodiments of a data store cluster are comprised of a set of data store nodes, which are used to store replicas of data store volume data, and serve read and write requests to computing resource instances. In some example embodiments, the data store volume data can be replicated to multiple data store nodes for many purposes, including, for example, durability and availability of the data.

Generally, the nodes on the data store cluster are operably interconnected via at least two networks. A primary network is a high-bandwidth network used for normal operation for all necessary communication with other data store nodes, with computing resource instances and with the data store control plane services. A secondary network, for example, is configured to be a replication network, which is a lower-capacity network used as a back-up network to allow data store nodes to communicate with other nodes in the data store cluster reliably and provide overflow capacity for data replication. When a first node of a data store cluster loses connectivity to a second node to which it was replicating data, the second node assumes the first node failed (or both nodes think the other one failed). To preserve durability, the node must locate a new node to which it can replicate its data (re-mirror the data). Alternative example embodiments of the control plane services also acts as the authority to the data store clusters when they elect primary replicas for each volume in the cluster (for consistency, there may only be a single primary replica for each volume at any time).

Example embodiments include a type of block storage service designed to enable a customer to create data store volumes, such as data store volumes 416a and 416b, which can be mounted as logical devices on computing resource instances 435a and 435b, respectively. A computing resource can be an instance running virtual system after a virtual machine is launched. Once launched, a computing resource behaves like a traditional server or hardware device component. Example embodiments of an instance will remain running until it is terminated by a customer or application or until it suffers a failure. A volume performs in a similar manner as an unformatted external network block device or device node and is generally configured to enable access to a storage device or data store located on a remote machine or computing resource.

Example embodiments of the volume can also be used for other purposes, such as a host for a file system. Example embodiments of the volume can be a persistent storage device that is configured to maintain the stored data, even when the computing resource is terminated or suffers a failure. There are many types of volumes, such as a standard volume or a provisioned input/output operations per second (IOPs) volume, such as a data store volume for high performance I/O intensive workloads.

In some example embodiments, a volume, once created, is tied to a data zone, such as data zones 420a and 420b, and is configured to be attached only to computing resources in the same data zone. For example, volume 416a is tied to data zone 420a and is attached only to computing resource instance 435a. In alternative example embodiments, a volume is tied to a region, such as region 410, and configured to be attached to computing resources in the same region. Still other embodiments enable a volume to be attached to a computing resource or instance in differing regions and/or data zones.

Example embodiments of a volume, such as a block level storage volume, can be configured to store data redundantly, enabling the volumes to be durable and available. Example embodiments include a load balancing service, such as the load balancer 415, which automatically balances and distributes application and/or user traffic across multiple computing resources.

In some example embodiments, each region is completely independent and each data zone is isolated, but the data zones in a region are connected through low-latency links, such as link 406. When a computing resource is launched, the root device volumes 409a and 409b contain the images 414a and 414b, respectively, and are used to boot the instance. In some example embodiments, a region, such as region 410, can be isolated from the other regions to improve fault tolerance and stability. A computing resource service (not shown) is configured so that the computing resource may be launched in multiple regions and fault zones that meet a customer's requirements.

Figure 5:
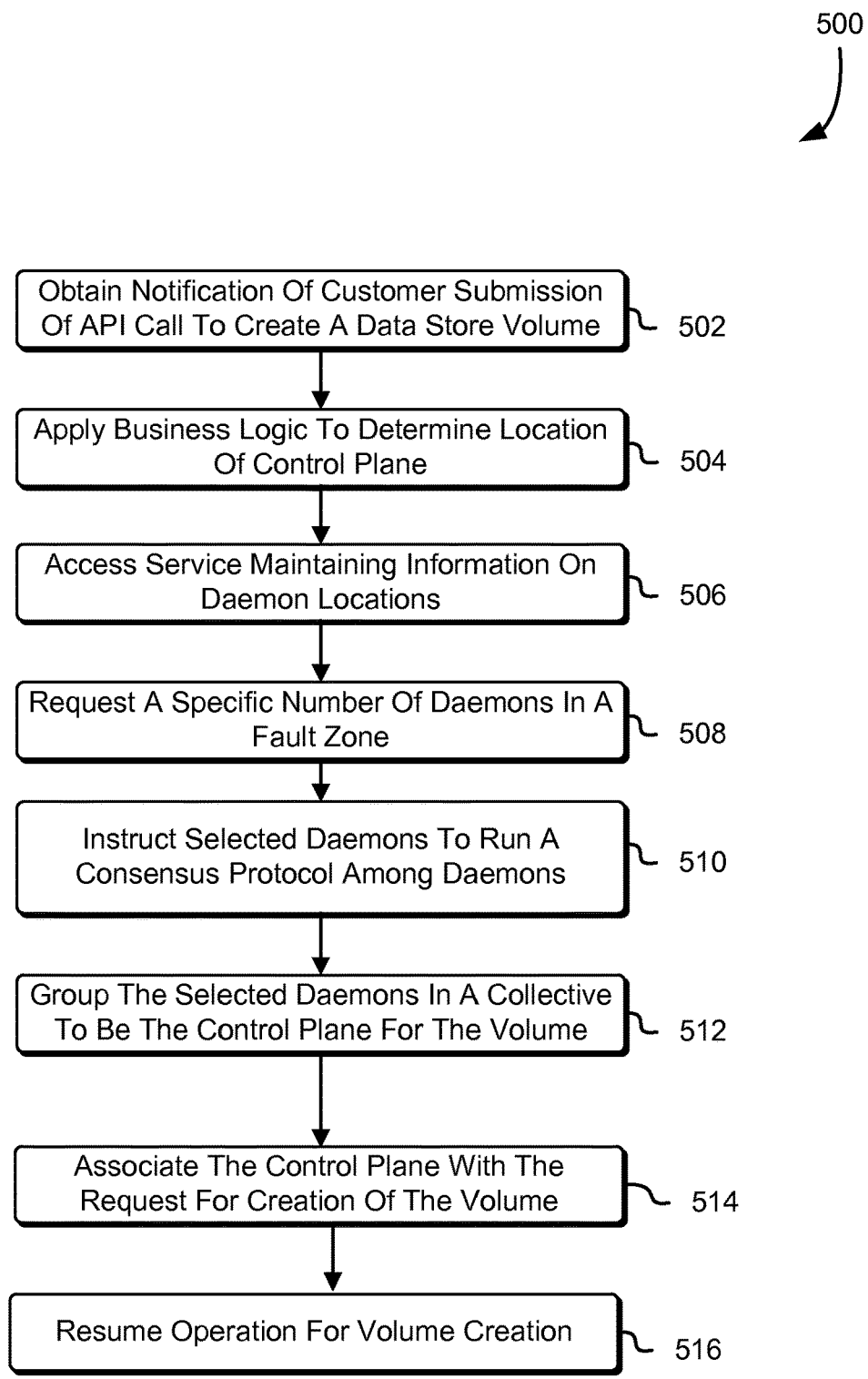
FIG. 5 is an illustrative example of a process for creating a control plane in response to volume creation in accordance with at least one embodiment.

FIG. 5 illustrates an example process 500 for provisioning a control plane for a requested volume. The process 500 may be accomplished by a control management unit (CMU), such as the CMU 255 described and illustrated in connection with FIG. 2, or a suitable component thereof. Returning to FIG. 5, the process 500 begins with the CMU obtaining or receiving a notification of a customer request to create a data store volume (502). The request can be transmitted via an application programming interface (API) that the customer interacts with to make the request, such as the API 207 as described and illustrated in connection with FIG. 2. Upon or near the time of the receipt of the notification, the CMU determines a suitable or desired fault zone for a control plane; the determination can be made according to business logic (504). The business logic can include heuristics about the customer and/or the volume, characteristics of possible fault zones, such as characteristics of data zones within different regions or other information useful for determining a fault zone for the control plane.

Returning to the process 500, the CMU can access a service that is configured to maintain information about the fault zones or characteristics of different computer processes (506, such as control agents A1-A3, B1-B3, C1-C3, D1, D2, E1, E1, F1 and G1 as described and illustrated in connection with FIG. 3. Returning to FIG. 5, the CMU can request a specific number of daemons in fault zones suitable for the volume (508). Alternative example embodiments include the CMU requesting the specified daemons based on information other than fault zones, for example, information on data centers near a possible fault zone or other business logic as described herein.

Returning to the process 500, the CMU, after selecting the daemons, instructs the selected daemons to execute a consensus protocol (510) in order to maintain agreement among the daemons as to settings related to the volume and/or control plane. After a successful consensus protocol has been executed, the CMU provides instructions to the selected daemons to form the control plane for the volume (512). The CMU associates the control plane with the request for creation of the volume (514) and resumes operations for the creation of the volume (516). In alternative example embodiments, the CMU can associate the control plane with the volume after the volume is created.

Figure 6:
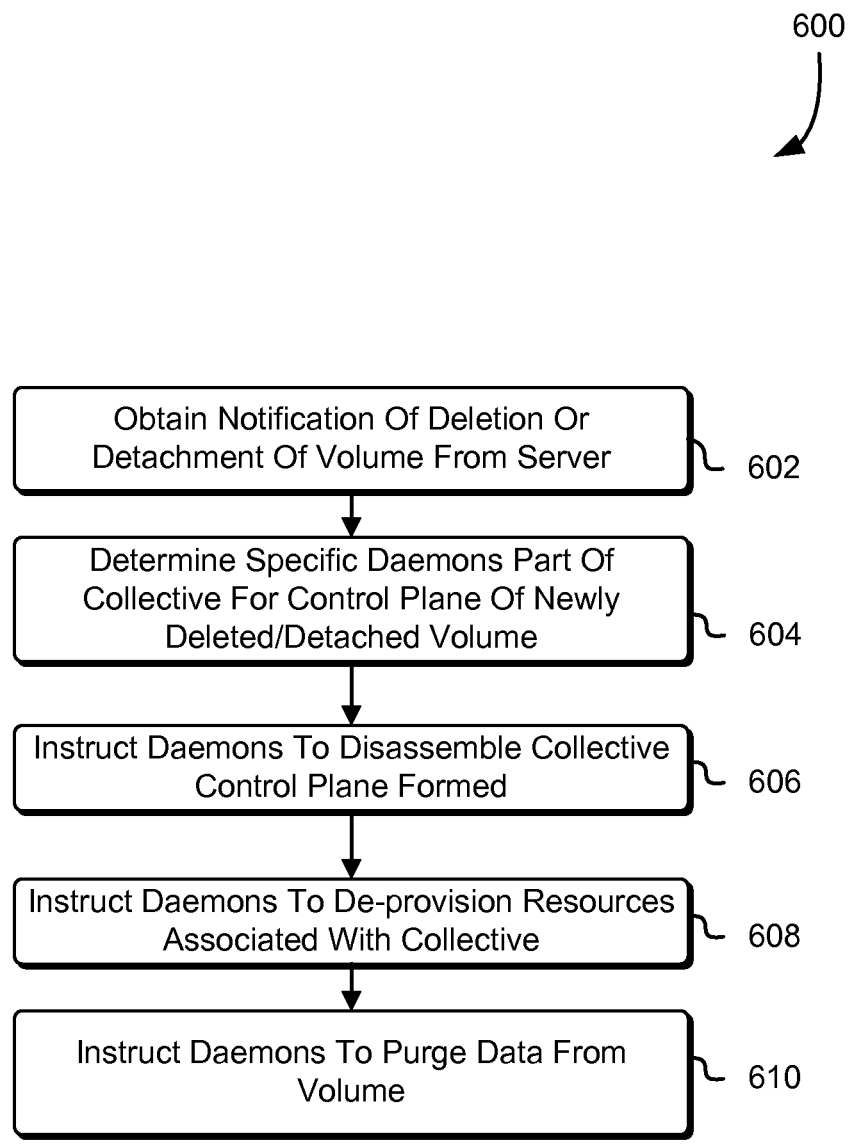
FIG. 6 is an illustrative example of a process for de-provisioning a control plane in response to volume deletion in accordance with at least one embodiment.

FIG. 6 illustrates an example process 600 for de-provisioning a control plane when the control plane is no longer necessary. The process 600 can be accomplished by a control management unit (CMU), such as the CMU 255 described and illustrated in connection with FIG. 2, or a suitable component thereof. Returning to FIG. 6, the process 600 begins with the CMU obtaining or receiving notification of the deletion or detachment of a volume from a server (602). In alternative example embodiments, the CMU could also receive notification of an intent of a customer to delete or detach the volume, or notification that the network, server or component thereof is requiring or requesting the volume be deleted or detached. In further alternative example embodiments, the CMU may experience an error or a failure, and, in such a circumstance, have to de-provision the control plane according to its own instructions.

Returning to the process 600, the CMU determines which selected daemons are members that formed the control plane for the volume (604) and instructs the daemons to disassemble the control plane (606). In alternative example embodiments, the CMU could instruct the daemons via a message sent to the members of the control plane or the CMU could send individual messages to each member of the control plane. Returning the process 600, the CMU further instructs the daemons to de-provision all resources associated with the control plane (608), including dissolving the consensus, and further instructs each daemon to purge any data about the volume maintained in the computing process (610).

Figure 7:
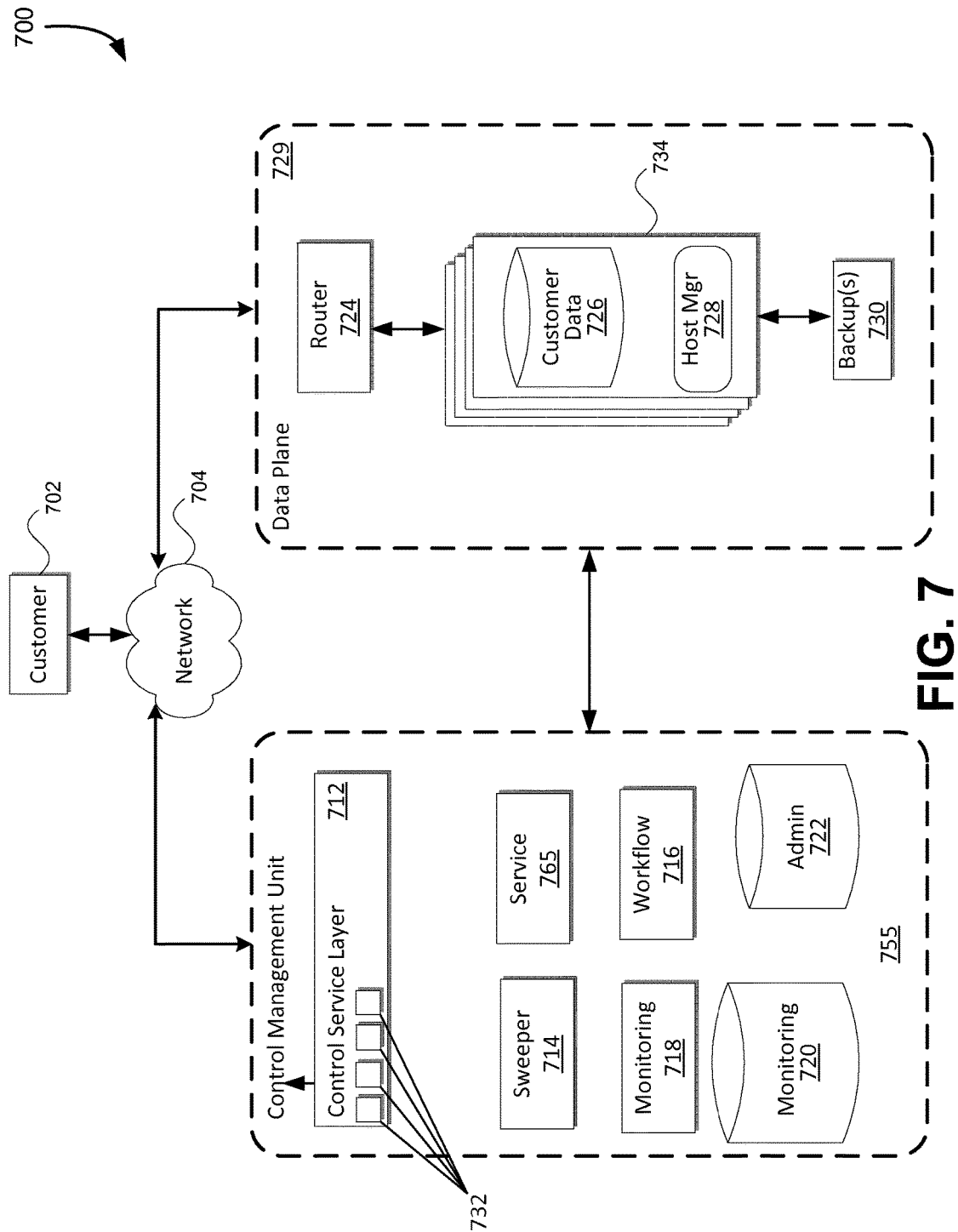
FIG. 7 illustrates an environment in which various embodiments can be implemented.

FIG. 7 illustrates an example of systems and methods in accordance with one embodiment of a block-level data storage service (data storage service) that enables developers, customers, or other authorized users to easily and cost-effectively obtain and configure data storage services and other such data sources so that customers can perform tasks such as storing, processing and querying storage data sets in an electronic environment. While this example is discussed with respect to the Internet, control services and Internet-based technology, it should be understood that aspects of the various embodiments can be used with any appropriate services available or offered over a network in an electronic environment. Further, while the service is referred to herein as a "block-level data storage service," it should be understood that such a service can be used with any appropriate type of replicated, distributed block store, data repository or data storage in an electronic environment. An data storage service in this example includes at least one control service that enables users or customers to easily manage block-level data without worrying about the administrative complexities of deployment, upgrades, patch management, backups, replication, failover, capacity management, scaling and other such aspects of data management. Customers are thus freed to develop sophisticated applications without worrying about the complexities of managing the data storage service infrastructure, such as executive control functions.

A data storage service in one embodiment provides a separate control management unit that includes components (e.g., hardware and software) useful for managing aspects of the data storage. In one embodiment, a set of data management application programming interfaces (APIs) or other such interfaces are provided that allow a customer to make calls into the data storage service to perform certain tasks relating to the data storage and data volumes. The customer still can use the direct interfaces or APIs to communicate with the data stores of the data storage service, however, and can use the data storage service-specific APIs of the control management unit only when necessary to manage the data store or perform a similar task.

FIG. 7 illustrates an example of a data storage service implementation 700 that can be used in accordance with one embodiment. In this example, a computing device of a customer 702 for an end-user is shown to be able to make calls through a network 706 into a control management unit 755 to perform a task such as to provision a data volume of the data plane 729. The customer or an application 704 can access the provisioned volume directly through an interface of a data plane 729. While an end user computing device and application are used for purposes of explanation, it should be understood that any appropriate customer, application, service, device, component or resource can access the interface(s) of the control management unit and/or data plane as appropriate in the various embodiments. Further, while the components are separated into control and data "planes," it should be understood that this can refer to an actual or virtual separation of at least some resources (e.g., hardware and/or software) used to provide the respective functionality.

The control management unit 755 in this example is essentially a virtual layer of hardware and software components that handles control and management actions, such as provisioning, scaling, failover situations, determining zones for a control plane, replication, etc. The control management unit 755 can also be configured to connect with a service 765, which can maintain information about computer processes or components of a control plane, such as geographic information of the computer processes to determine zones for the control plane. The processes can be stored or run on computers reserved for the control management unit, on hardware data storage servers or both. Example embodiments of the computer processes can further be executed in a virtualized environment separated from a virtualized data storage server. The control management unit in this embodiment includes a control services layer 712, or tier, which can include at least one server, for example, along with computer-executable software, application servers or other such components. The control services layer also can include a set of APIs 732 (or other such interfaces) for receiving services calls or requests from across the network 706. Each API can be provided to receive requests for at least one specific action to be performed with respect to the data environment, such as to provision, create, attach, detach or delete volumes and/or computing resources of the data storage service. Upon receiving a request to one of the APIs, the control services layer can parse or otherwise analyze the request to determine the steps or actions needed to act on or process the call. For example, a control service call might be received that includes a request to create a volume. In this example, the control services layer can parse the request to determine the type of volume to be created, the type of hardware requested (if any) or other such aspects. Information for the request can be written to an administration ("Admin") data store 722, or other appropriate storage location or job queue, for subsequent processing.

A control service layer in one embodiment includes a scalable set of customer-facing servers that can provide the various control management unit APIs and return the appropriate responses based on the API specifications. The control service layer also can include at least one API service layer that in one embodiment consists of stateless, replicated servers, which process the externally-facing customer APIs. The control service layer can be responsible for control service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the control services layer and/or API service layer will be the only externally visible component, or the only component that is visible to, and accessible by, customers of the control service. The servers of the control services layer can be stateless and scaled horizontally as known in the art. API servers, as well as the persistent data store, can be spread across multiple data centers in a geographical region or near a geographical area, for example, such that the servers are resilient to single data center failures or data zone failures.

The control management unit 755 in this embodiment includes what is referred to herein as a "sweeper" component 714. A sweeper component can be any appropriate component operable to poll various components of the control management unit or otherwise determine any tasks to be executed in response to an outstanding request. In this example, the control services layer might place instructions or information for the "create volume" request in the admin data store 722, or a similar job queue, and the sweeper can periodically check the admin data store for outstanding jobs. Various other approaches can be used as would be apparent to one of ordinary skill in the art, such as the control services layer sending a notification to a sweeper that a job exists. The sweeper component can pick up the "create volume" request, and using information for the request can send a request, call, or other such command to a workflow component 716 operable to instantiate at least one workflow for the request. The workflow in one embodiment is generated and maintained using a workflow service. A workflow in general is a sequence of tasks that should be executed to perform a specific job.

The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: volume creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a volume and applying information extracted from the original request. For example, the workflow component can select specific tasks related to the amount of storage requested, any specific hardware requirements or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create volume" workflow for a customer might include tasks such as provisioning a computing resource instance, allocating a volume of off-instance persistent storage, attaching the persistent storage volume to the computing resource instance, then allocating and attaching a DNS address or other address, port, interface, or identifier which the customer can use to access or otherwise connect to the computing resource instance. In this example, a customer is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "volume" in response to the "create volume" request, which actually corresponds to a computing resource instance in the data plane 729, and provide the DNS address to be used to access the instance. A user then can access the computing resource instance directly using the DNS address and port, without having to access or go through the control management unit 755. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a volume, and can return the current state of the process. In some example embodiments, the workflow component and/or workflow service do not make the actual calls or requests to perform each task, but instead manage the state and configuration information for the workflow that enables the components of the control management unit to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control management unit. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control management unit 755 in this embodiment also includes at least one monitoring component 718. When a computing resource instance is created in the data plane, information for the instance can be written to a data store in the control management unit, such as a monitoring data store 720. It should be understood that the monitoring data store can be a separate data store, or can be a portion of another data store such as a distinct set of tables in an Admin data store 722 or other appropriate repository. A monitoring component can access the information in the monitoring data store to determine active instances 734 in the data plane 729. A monitoring component also can perform other tasks, such as collecting log and/or event information from multiple components of the control management unit and/or data plane, such as the control service layer, workflow component, sweeper component and various host managers. Using such event information, the monitoring component can expose customer-visible events, for purposes such as implementing customer-facing APIs. A monitoring component can constantly monitor the health of all the running volumes and/or instances for the control management unit, detect the failure of any of these instances, and initiate the appropriate recovery process(es).

Each instance 734 in the data plane can include at least one data store 726 and a host manager component 728 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new volume, including setting up logical volumes and file systems, installing database binaries and seeds, and starting or stopping the volume. A host manager can monitor the health of the data store of a volume, as well as monitoring the data store for error conditions such as I/O errors or data storage errors, and can restart the data store of the volume if necessary. A host manager also perform and/or mange the installation of software patches and upgrades for the data store of the volume and/or operating system. A host manger also can collect relevant metrics, such as may relate to CPU, memory and I/O usage.

The monitoring component can communicate periodically with each host manager 728 for monitored instances 734, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 722 or another such job queue to perform an action for the instance, such as to verify the problem and re-provision the instance if necessary. The sweeper can access this information and kick off a recovery workflow for the instance to attempt to recover from the failure automatically. The host manager 728 can act as a proxy for the monitoring and other components of the control management unit, performing tasks for the instances on behalf of the control management unit components. Occasionally, a problem will occur with one of the instances, such as the corresponding host, instance or volume crashing, rebooting, restarting, etc., which cannot be solved automatically. In one embodiment, there is a logging component (not shown) that can log these and other customer visibility events. The logging component can include an API or other such interface such that if an instance is unavailable for a period, a customer can call an appropriate "events" or similar API to get the information regarding the event. In some cases, a request may be left pending when an instance fails. Since the control management unit in this embodiment is separate from the data plane, the control management unit, in some example embodiments, never receives the data request and thus cannot queue the request for subsequent submission (although in some embodiments this information could be forwarded to the control management unit). Thus, the control management unit in this embodiment provides information to the customer regarding the failure so the customer can handle the request as necessary.

As discussed, once an instance is provisioned and a customer is provided with a DNS address or other address or location, the customer can send requests "directly" to the data plane 729 through the network using a Java Database Connectivity (JDBC) or other such client to directly interact with that instance 734. In one embodiment, the data plane takes the form of (or at least includes or is part of) a computing environment, or a set of control services and resources that provides data storage and access across a dynamic network of hardware and/or software components. A DNS address is beneficial in such a dynamic environment, as instance or availability failures, for example, can be masked by programmatically remapping a DNS address to any appropriate replacement instance for a use. A request received from a customer 702 or application 704, for example, can be directed to a network address translation (NAT) router 724, or other appropriate component, which can direct the request to the actual instance 734 or host corresponding to the DNS of the request. As discussed, such an approach allows for instances to be dynamically moved, updated, replicated, etc., without requiring the user or application to change the DNS or other address used to access the instance. As discussed, each instance 734 can include a host manager 728 and a data store 726, and can have at least one backup instance or copy in persistent storage 730. Using such an approach, once the instance has been configured through the control management unit, a customer, application, service or component can interact with the instance directly through requests to the data plane, without having to access the control management unit 755. For example, the customer can directly issue structured query language (SQL) or other such commands relating to the data in the instance through the DNS address. The customer would only have to access the control management unit if the customer wants to perform a task such as expanding the storage capacity of an volume. In at least one embodiment, the functionality of the control management unit 755 can be offered as at least one service by a provider that may or may not be related to a provider of the data plane 729, but may simply be a third-party service that can be used to provision and manage data instances in the data plane, and can also monitor and ensure availability of those instances in a separate data plane 729. Techniques described above are application to other services, such as database service where there are control planes for the database volumes.

Figure 8:
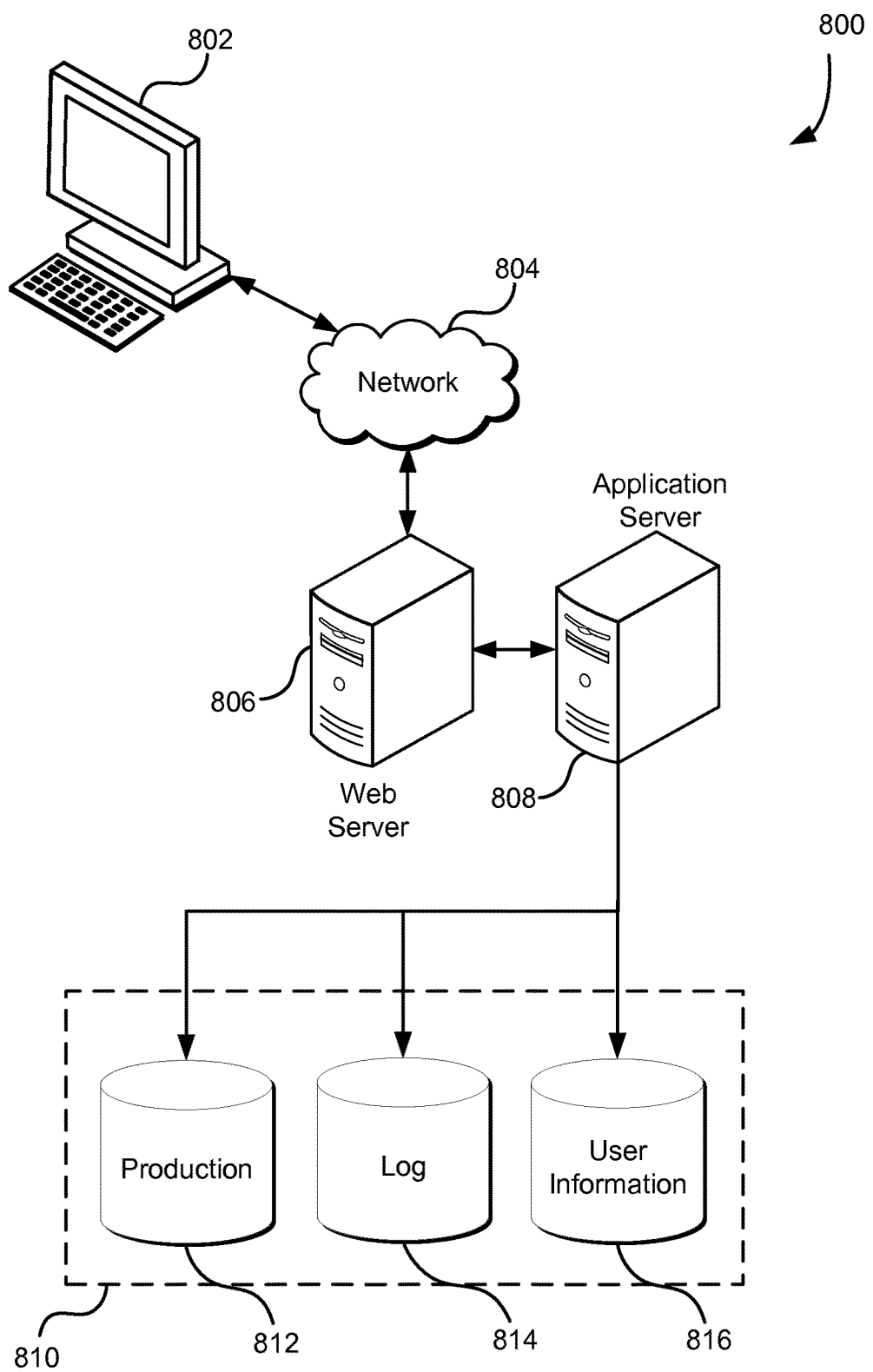
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
in response to receiving a volume creation request:
applying predetermined logic to determine a set of fault zones in which to construct a control plane for a volume and in which to instantiate the volume;
applying the predetermined logic to determine a number of dynamic control agents to form the control plane;
selecting, from a set of dynamic control agents in the set of fault zone a subset of dynamic control agents complying with the number;
instructing individual dynamic control agents of the subset to execute a consensus protocol to form consensus on one or more settings for the volume;
providing data corresponding to the volume into at least one data store operably interconnected to the control plane; and
causing the volume to be instantiated in accordance with the predetermined logic.

2. The computer-implemented method of claim 1, wherein the consensus protocol is configured to enforce consistent operation between the subset of dynamic control agents.

3. The computer-implemented method of claim 1, wherein the data includes at least metadata of the volume, a location of the volume, and/or a service hosting the volume.

4. The computer-implemented method of claim 1, wherein the subset of dynamic control agents are members of a larger number of different control planes, such that a control plane for each volume includes a set of dynamic control agents and each of the subset of dynamic control agents is a member of a control plane of other volume.

5. A system, comprising:
at least one computing device that implements one or more services, wherein the one or more services:
in response to receipt of a request to create a volume, apply selection logic to select a subset of a set of computer system processes, the set of computer system processes being:
able to participate in operation as a control plane for the volume; and
distributed among a plurality of computing devices; and
transmit one or more instructions that cause the subset to operate as the control plane for the volume, the instructions including at least instructions for executing a consensus protocol to form consensus on one or more settings related to the volume.

6. The system of claim 5, wherein the selection logic is based at least in part on a type of volume, one or more customer heuristics, one or more volume heuristics and/or a placement of the volume in a computing environment.

7. The system of claim 5, wherein the set of computer system processes execute the consensus protocol for replica control in a replicated database, wherein the consensus protocol is a quorum-based voting system scheme.

8. The system of claim 5, wherein the control plane and a data store operably interconnected with the control plane are located in a same fault zone as the volume.

9. The system of claim 8, wherein the system is further configured to assign at least one new computer process to the control plane when the subset of computer processes included in the control plane no longer maintains a quorum.

10. The system of claim 5, wherein each of the set of computer system processes is a member of more than one control plane at a same or different time.

11. The system of claim 5, wherein the one or more services are further configured to maintain an authoritative volume and a replicate volume in separate data zones in a same region.

12. The system of claim 5, the control plane is further configured to:
receive a notification that the volume was removed from a server;
instruct a computer processes of the control plane to dissolve the control plane;
instruct each of the computer processes to de-provision resources associated with the volume; and
instruct each of the computer processes to purge data related to the volume.

13. A non-transitory computer-readable storage medium having collectively stored thereon executable instructions that, if executed by one or more processors of a computer system, cause the computer system to:
- receive a request to create a volume for a control plane;
- receive a set of parameters for the control plane to be created for the volume;
- determine, based at least in part on the set of parameters, a zone in which to construct the control plane for the volume;
- select, based at least in part on the set of parameters, a subset of a set of control agents, the set of control agents able to participate in operation of the control plane for the volume including at least executing a consensus protocol to form consensus on one or more settings related to the volume; and
- provide information indicating the subset thereby enabling the subset to be used to create the control plane for the volume.

14. The non-transitory computer-readable storage medium of claim 13, wherein the executable instructions further comprise instructions that cause the computer system to maintain the subset of the set of control agents on a same server as a data plane machine.

15. The non-transitory computer-readable storage medium of claim 13, wherein the executable instructions further comprise instructions that cause the computer system to:
- dynamically configure a system type on a sliding scale between a distributed system with a quorum and a centralized system located in proximity relative to the volume based on business logic; and
- update the system type at any point during existence of the volume.

16. The non-transitory computer-readable storage medium of claim 13, wherein the executable instructions further comprise instructions that cause the computer system to:
- maintain multiple members in the subset of the set of control agents; and
- instruct the subset of the set of control agents to execute the consensus protocol.

17. The non-transitory computer-readable storage medium of claim 13, wherein the executable instructions further comprise instructions that cause the computer system to determine the subset of the set of control agents based at least in part on a zone in which to construct the volume.

18. The non-transitory computer-readable storage medium of claim 17, wherein the executable instructions that cause the computer system to determine the subset of the set of control agents include instructions that cause the computer system to determine the subset of the set of control agents based at least in part on a power reliability factor in the zone, a concentration of data centers in the zone or a distance between data centers in the zone in which to construct the volume.

19. The non-transitory computer-readable storage medium of claim 13, wherein the executable instructions further comprise instructions that cause the computer system to maintain a control management component as an executive function control plane, wherein the control management component is configured to manage control planes across a network.

20. The non-transitory computer-readable storage medium of claim 19, wherein the executable instructions that cause the computer system to maintain the control management component further include instructions that cause the computer system to cause the control management component to:
- receive an application programming interface (API) request specifying new parameters for the control planes; and
- reselect a subset of control agents from the set of control agents to satisfy the new parameters.

\* \* \* \* \*